Figure 1:
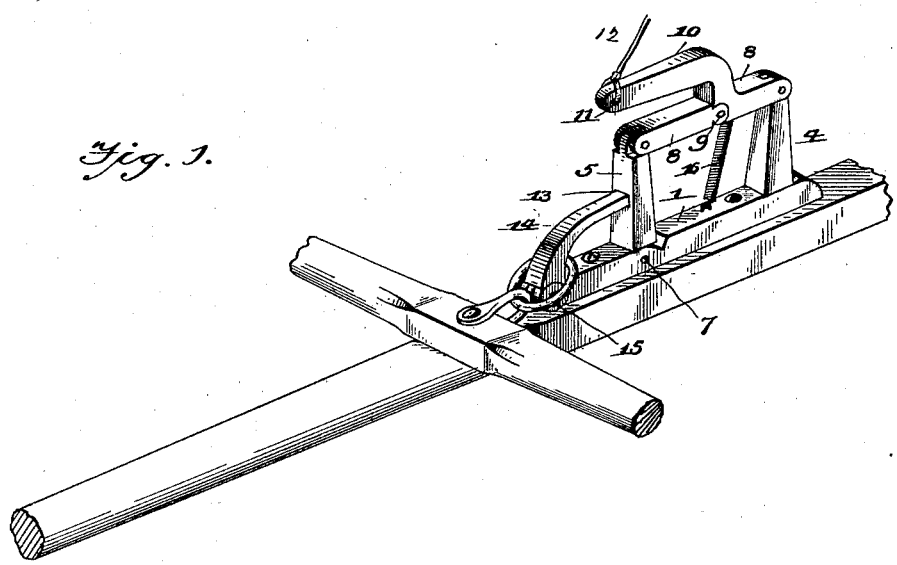

No. 609,724. Patented Aug. 23, 1898.
AUGUST BAATZ & ALBERT BAATZ.
HORSE DETACHER.
(Application filed Jan. 6, 1898.)

(No Model.)

Witnesses
Inventors
August Baatz.
Albert Baatz.

UNITED STATES PATENT OFFICE.

AUGUST BAATZ AND ALBERT BAATZ, OF BUTTERNUT, WISCONSIN.

HORSE-DETACHER.

SPECIFICATION forming part of Letters Patent No. 609,724, dated August 23, 1898.

Application filed January 6, 1898. Serial No. 665,814. (No model.)

*To all whom it may concern:*

Be it known that we, AUGUST BAATZ and ALBERT BAATZ, citizens of the United States, residing at Butternut, in the county of Ashland and State of Wisconsin, have invented certain new and useful Improvements in Horse-Detachers; and we do hereby declare the following to be a full, clear, and exact description of the invention, such as will enable others skilled in the art to which it appertains to make and use the same.

This invention relates to horse-detachers, the object in view being to provide a simple and reliable device which may be connected either to the tongue or running-gear of a vehicle for the purpose of normally retaining in proper position the whiffletree, being also designed to quickly release the whiffletree for detaching the draft animal or animals and harness, thus averting serious accident.

The detailed objects and advantages of the invention will appear in the course of the subjoined description.

The invention consists in an improved horse-detaching device embodying certain novel features and details of construction hereinafter specifically described, illustrated in the drawings, and incorporated in the claims hereto appended.

Figure 2:
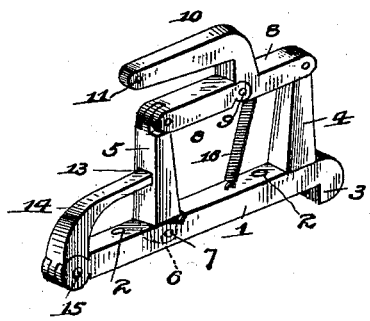

In the accompanying drawings, Figure 1 is a perspective view showing the improved detaching device applied to the tongue of a vehicle and having the whiffletree in engagement therewith. Fig. 2 is a detail perspective view of the device, *per se.*

Similar numerals of reference designate corresponding parts in both figures of the drawings.

The improved device comprises, essentially, a base-bar 1, and this is provided with two or more openings 2 to receive vertical bolts adapted to pass downward through the tongue or running-gear of the vehicle, according to the position in which the device is placed. The bar 1 is preferably provided at its heel or rear end with a depending tongue or hook 3, adapted to engage behind the tongue or enter a vertical opening or socket therein, so as to remove the main part of the strain from the bolts which pass through the openings 2.

Extending upward from the heel end of the bar or base 1 is an upright 4, and pivotally connected to the base 1 at a point intermediate its ends is a second upright 5, the same being provided at its lower end with a centrally-located ear 6, which enters an opening in the base 1, being secured by means of a transverse pivot 7, which allows the upright 5 to swing in a direction longitudinal of the tongue. The uprights 4 and 5 are pivotally connected at their upper ends by means of a pair of toggle-links 8, and these toggle-links are connected at their adjacent ends by a knuckle-joint 9, having stop projections or shoulders, which limit the links in a downward direction for preventing them from passing beyond horizontal alinement with each other. One of the links 8, and preferably the rear one, is extended beyond the knuckle-joint 9 to form an L-shaped lever-arm 10, provided at its extremity with an opening 11 to receive a cord or other suitable device, by means of which the lever may be rocked upward. When the lever is so rocked upward, it will be seen that the links 8 will be correspondingly elevated at their central point of connection, thus rocking the swinging upright 5 rearward.

The swinging upright 5 is provided in its front side with a socket 13, intended to receive the point or bill of a rearwardly-extending hook 14, which is pivotally connected at its base to the extreme forward end of the base or bar 1 upon a transverse horizontal pin or bolt 15. The hook 14 is designed to receive the ring or loop of a whiffletree, thus providing for the attachment of the whiffletree to the tongue.

From the foregoing description it will be understood that by drawing upward on the cord 12 the lever-arm 10 will be moved upward, thereby lifting the links 8 and rocking the upright 5 in a rearward direction, the links 8 being normally held downward in the position shown in the drawings by means of a coil-spring 16, interposed between the pivotal connection of said links and the bar or base 1. When the upright 5 swings back, the point or bill of the hook 14 is released from its engagement with said upright, and the pulling strain of the whiffletree on the hook 14 causes it to fly upward and forward, thereby releasing the whiffletree and detaching the animal or animals from the vehicle.

Having thus described the invention, what is claimed as new, and desired to be secured by Letters Patent, is—

1. In a horse-detacher, a pivoted hook for holding the whiffletree, in combination with a swinging piece having a socket to receive the point of said hook and prevent the latter from swinging, a fixed upright, toggle-links connecting the upright and swinging piece, and means for operating said links, substantially as described.

2. In a horse-detacher, the combination with a base adapted to be secured to a vehicle, of a whiffletree-hook pivotally connected to said base and extending rearward, a stationary upright on said base, a pivoted upright on the base having a socket to receive and hold the hook, toggle-links interposed between the stationary and pivoted uprights, a spring for holding said links in alinement with each other, and a lever-arm on one link whereby the links may move out of alinement, substantially as and for the purpose described.

3. In a horse-detacher, in combination, a base provided at one end with a rigid hook, a pivoted and rearwardly-extending hook at the opposite end of the base, a stationary upright at the heel end of the base, a pivoted upright on the base having a socket to receive the end of the hook, toggle-links connecting the upper ends of said uprights, a spring for maintaining said links in longitudinal alinement, a lever-arm on one of said links, and a flexible connection attached to said lever-arm, all arranged for joint operation, substantially as described.

In testimony whereof we affix our signatures in presence of two witnesses.

AUGUST BAATZ.
ALBERT BAATZ.

Witnesses:
G. M. LEICHTNAUR,
PAUL KANNEBERG.